July 18, 1967
H. S. BACON
3,331,460
LAND VEHICLE PROVIDED WITH COLLISION
RESISTANT SAFETY FEATURES
Filed July 30, 1965
4 Sheets-Sheet 2
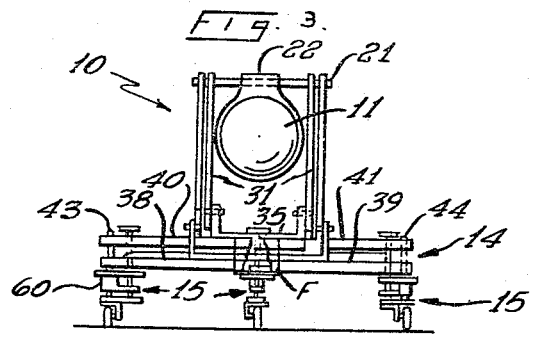
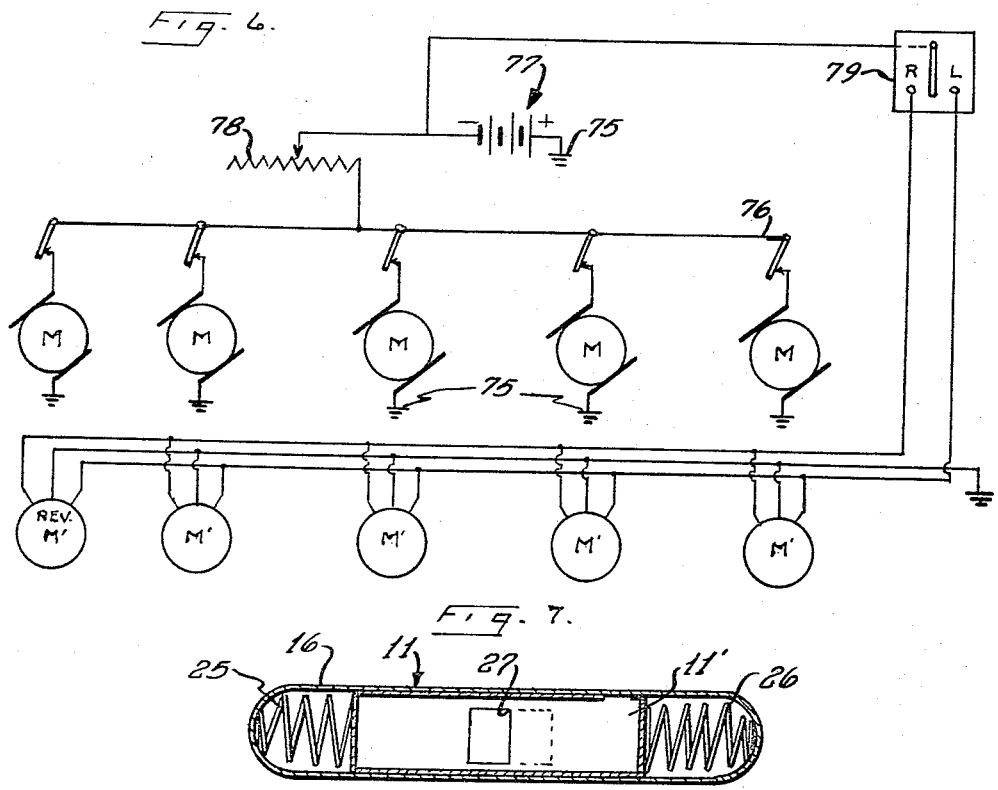
INVENTOR.
HENRY S. BACON
BY
Howard T. Jemden
AGENT

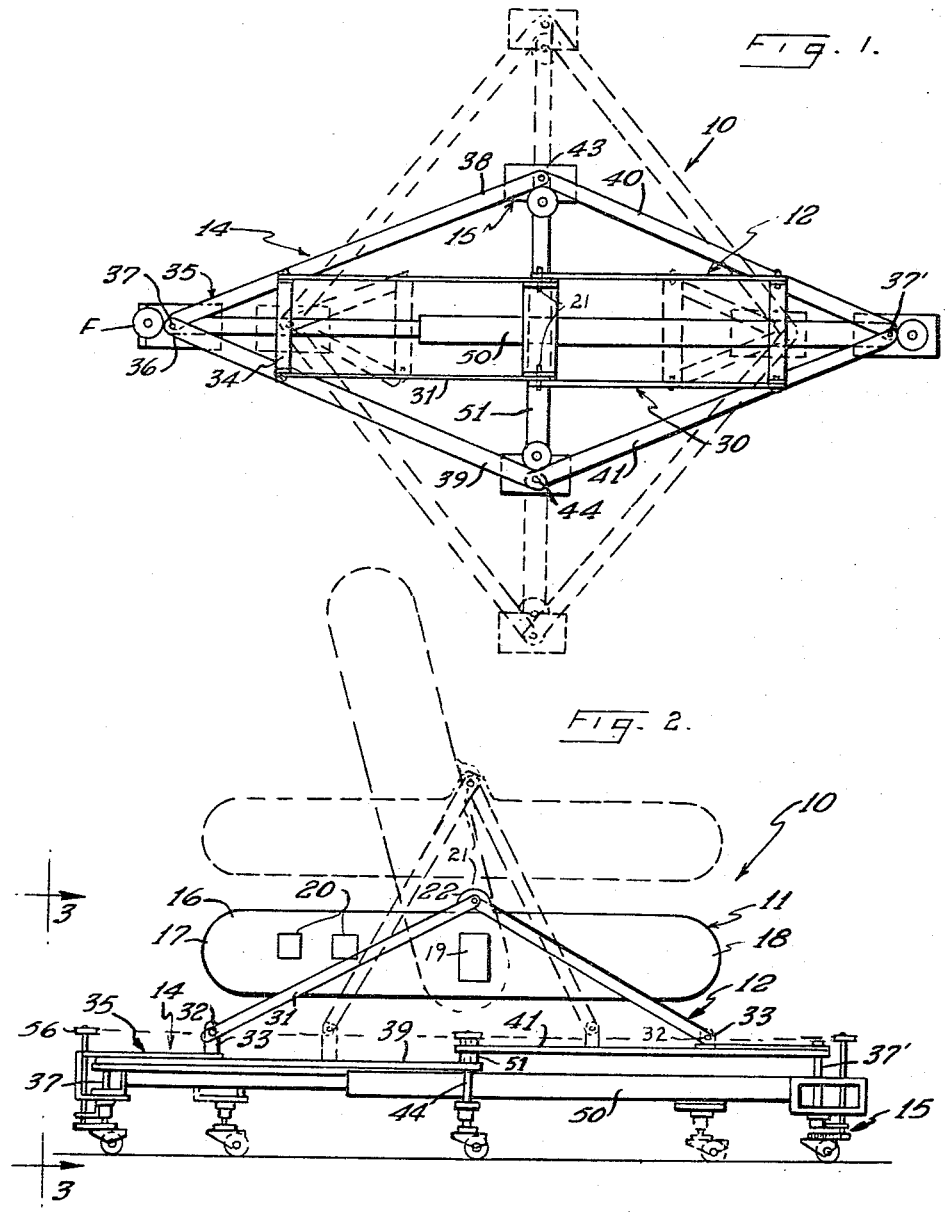

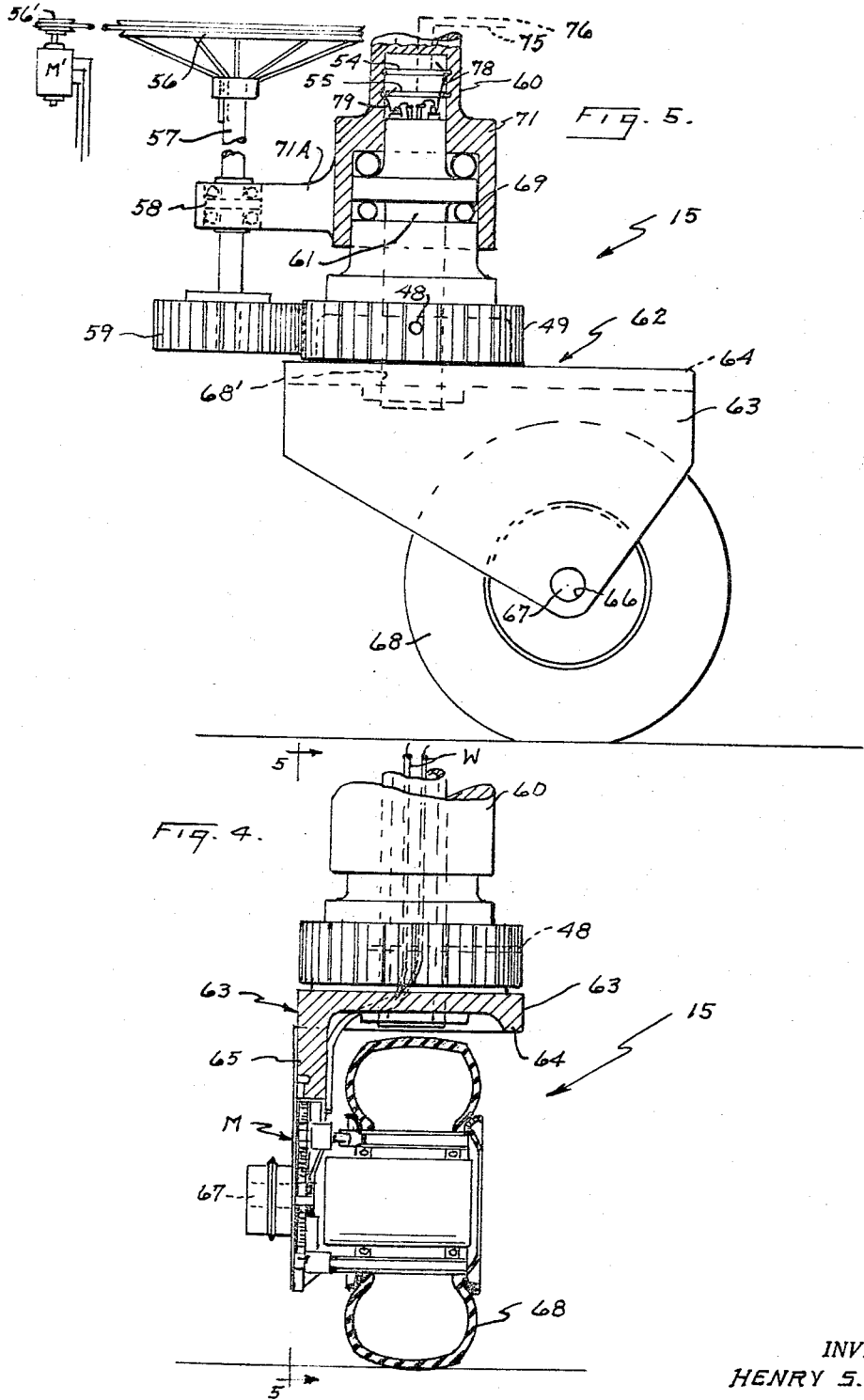

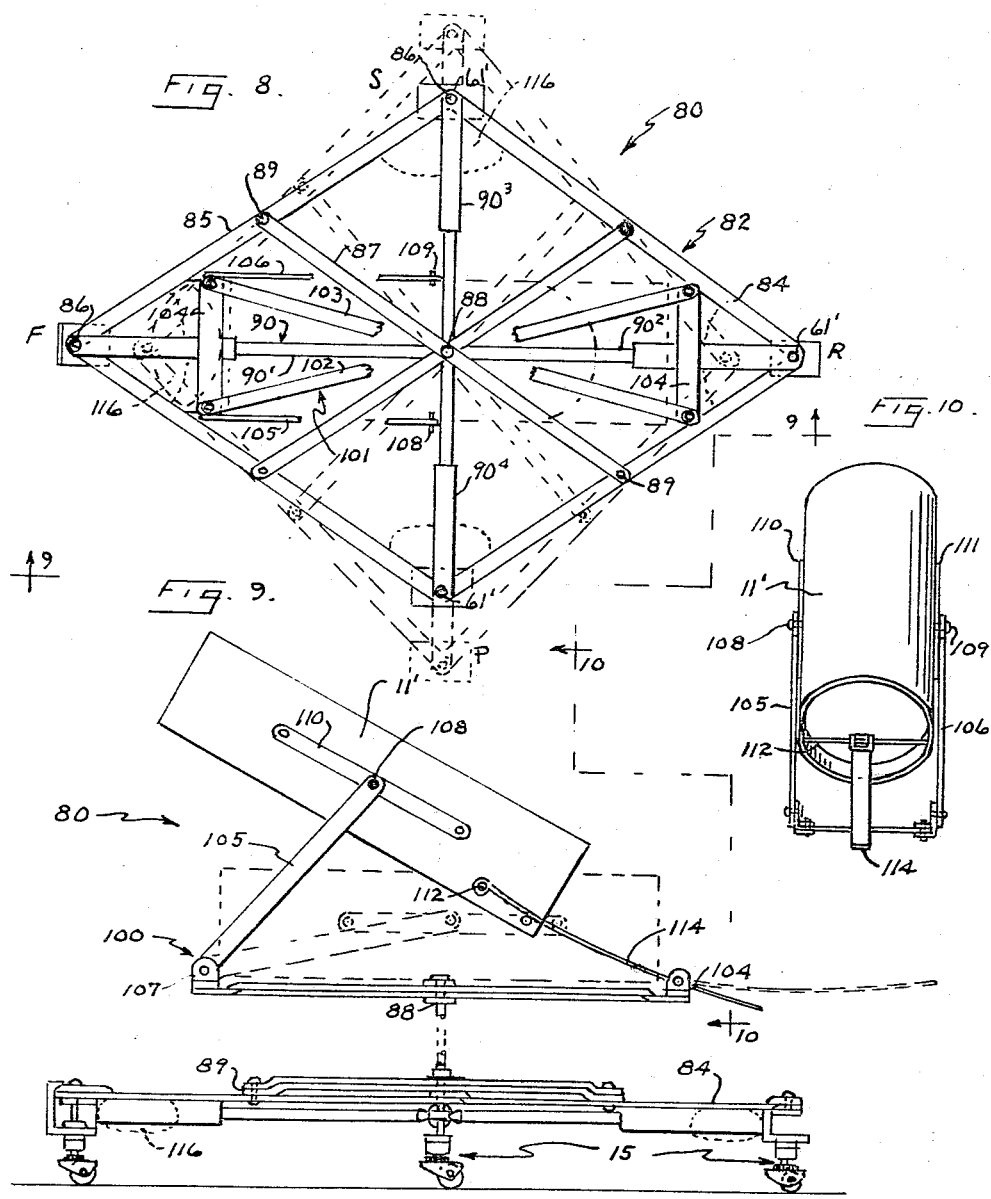

United States Patent Office 3,331,460
Patented July 18, 1967

3,331,460
LAND VEHICLE PROVIDED WITH COLLISION
RESISTANT SAFETY FEATURES
Henry S. Bacon, Box 196, Shrewsbury, N.J. 07701
Filed July 30, 1965, Ser. No. 475,976
14 Claims. (Cl. 180—1)

This invention relates to a land vehicle that may be dropped from the air and that is floatable in water and more particularly to a collision resistant vehicular body that is designed to neutralize, disperse and absorb destructive kinetic energies generated by collision and is pivotally supported on an expansile and contractile framework and in which said framework is carried upon a plurality of swiveling wheels.

This invention includes the complete structure for a vehicle in which the vehicular body is pivotally supported upon a pair of bipod-like struts and in which said struts are in turn connected at their free end to an expansile and contractile undercarriage and in which said expansile and contractile undercarriage is provided with shock absorbing elements to normally retain said undercarriage in an operative form and in which said undercarriage is supported upon a plurality of swiveling caster like wheels.

In the development of land vehicles the vehicle has in the past been provided as a solid body and undercarriage with little or no provision for avoiding, diverting or absorbing the shock of collision. The only provision for shock of collision found in the prior art is in the adaptation of shock absorbing bumpers which provide a fraction of the necessary absorption in a serious collision.

It is an object of this invention to provide a land vehicle with a considerable amount of safety, also diversion of shock and resistance by absorption upon collision thus preventing injury of personnel or vehicle.

A further object of this invention is to provide a land vehicle with a multi-tubular safety body that is mounted in a free swinging relationship to its supporting structure and in which the supporting structure is affixed to a shock absorbing undercarriage to prevent or neutralize damage and in which said shock absorbing undercarriage is in turn mounted upon a plurality of swiveling wheels that will turn for movement in the direction of a force of impact to thus provide in combination an optimum degree of shock absorption, neutralization and diversion upon impact.

A further object of this invention is to provide a land vehicle that may be dropped a minimal distance from the air upon the land and in which the undercarriage of the vehicle is expanded in a hanging position in the air and in which said undercarriage absorbs the shock upon impact with a landing surface to provide a high degree of resistance to damage resulting from landing.

Other provisions of this invention shall be apparent by reference to the accompanying detailed description and the drawings in which FIG. 1 is a plan view of the vehicle, FIG. 2 is a side elevational view of the vehicle, FIG. 3 is an end elevational view taken on line 3—3 of FIG. 2, FIG. 4 is an enlarged end view of a caster wheel, FIG. 5 is an enlarged side elevational view taken on line 5—5 of FIG. 4, FIG. 6 is a schematic diagram of the electrical control circuit for said swiveling caster wheels, FIG. 7 is a cross sectional view of a further embodiment of the multi-tubular vehicular body, FIG. 8 is a plan view of a further embodiment of this invention, FIG. 9 is a side elevational view taken on line 9—9 of FIG. 8, and FIG. 10 is an end elevational view taken on line 10—10 of FIG. 9.

In accordance with the provisions of this invention there is illustrated a complete land vehicle 10 in FIGS. 1, 2 and 3. Vehicle 10 is made up of the following components, a vehicular body 11, a supporting framework 12, expansile undercarriage 14 and a plurality of swiveling caster wheels 15. In this vehicle the body 11 may take various forms but in the preferred embodiment it is formed as a multi-tubular structure 16 closed at either end 17 and 18. The vehicular body 11 may be provided with a slidable or rotatable door 19 for entry and exit to said body and of course the multi-tubular body 16 may be provided with a plurality of windows 20. The multi-tubular body 16 is provided with a supporting bearing 22 across the upper central portion of said body or may be positioned on the sides above a point of balance and a shaft 21 pivotally mounted in said bearing 22. A further embodiment of the multi-tubular body 16 is illustrated in FIG. 7 in which there is provided an outer core tubular body 16 and a second tubular body 11' mounted within tube 16 so that either end of the tubular body 11' may be cushioned from the ends of the tubular body 16 such as by a spring or air cushion to provide a shock absorbing effect within body 16.

Referring again to FIGS. 1, 2 and 3, it is apparent that body 11 is hung between a pair of bipod struts 30, the bipod consisting of two struts 31 that are pivotally joined at one end by shaft 21, shaft 21 extending through one bipod support 30, through bearing 22 of the body 11 and through the opposite bipod support 30, thus supporting body 11. The bipod struts 31 are pivotally attached at their free ends by a pin 32. Pin 32 is also mounted in the upturned ends 33 of a bracket 34. Bracket 34 being the base of a triangular frame 35 whose apex 36 is affixed upon a pin 37 at one end of vehicle 10 and pin 37¹ at the opposite end. Pins 37 and 37¹ are utilized as the anchoring pins for the front and rear ends of the vehicle. Mounted under the triangular frames 35 is the main undercarriage structure 14 which consists of two forwardly positioned struts 38 and 39 and two rearwardly positioned struts 40 and 41. The forward ends of struts 38 and 39 are pivotally affixed to pin 37, while the rearward ends of struts 40 and 41 are pivotally affixed to pin 37¹. Struts 38 and 40 are pivotally joined at their opposite ends by a pin 43, while struts 39 and 41 are also pivotally joined at their opposite ends by a pin 44. The joined framework will, under free movement, assume the full line position illustrated on FIG. 1 and 2 as a normal operating position. However, assuming the front end F strikes an immovable body the undercarriage framework will be compressed longitudinally while it expands laterally to assume the dotted position illustrated in FIGS. 1 and 2. It is to be noted that in the vehicles longitudinally expanded position that the vehicle body hangs in its lowest full line position, but when the undercarriage moves to its broadest or expanded position, the bipod struts 30 raise the vehicle body 11 to the dotted position (FIG. 2) and in the event the vehicle is suddenly decelerated, the body 11 will, due to its suspension, swing to an angular raised position as indicated in dotted lines (FIG. 2).

Referring again to FIG. 2 it is to be noted that the undercarriage 14 also includes restraining shock absorbing elements. To absorb a straight forward shock there is a foreshortening of shock absorbing cylinder 50 that is attached at its front end to pin 37 and attached at its rear end to pin 37¹, thus absorbing all shock along the longitudinal axis from 37 to 37¹. To absorb any side shock there is a breadth resistant or lateral shock absorbing cylinder 51 that is attached on one side to pin 43 and on the other side to pin 44, thus absorbing all shock along the axis from 43 to 44. It is to be noted that any impact or great pressure of any one of the four junction points of the frame will provide a resultant resistance upon the framework to produce two components of resistance through both shock absorbers 50 and 51. The shock absorbing elements 50 and 51 may also be double acting shock absorbers in that they may resist shock whether in compression or in tension. Referring to FIG. 1 an abrupt deceleration produces a compresson of shock absorbing element 50 while producing a resistance to this compression in shock strut 51. When the vehicle is subjected to forceful impact against the extreme side joints or connected elements, the shock 51 acts in compression while the shock 50 acts to dispose this force.

To assist the vehicle 10 in its lateral movement due to the impact of another vehicle, the complete undercarriage is mounted and supported by a plurality of free swiveling casters 15. The casters 15 are more particularly illustrated in FIGS. 4 and 5, caster 15 comprising a supporting strut cylinder 60 that is affixed to the undercarriage 14, cylinder 60 supports a shaft 61. Shaft 61 is hollow and provides the rotational support for the caster 62. Caster 62 at one end is provided with a frame 63 having a base 64 and one side 65. The side 65 is provided with an aperture 66 through which a shaft 67 is mounted. A wheel 68 is mounted on shaft 67. Frame 63 is also provided with an aperture $68^1$ through which pin 61 extends and fits loosely therein. Mounted on the supporting pin 61 are bearings 69. Bearings 69 are mounted in a cup 71 affixed to cylinder 60. Thus caster 62 is pivotally mounted on shaft 61. Referring specifically to FIG. 4 there is illustrated a motor M mounted on the same shaft 67 that supports wheel 68. The motor M illustrated may be similar to the motor detailed in Patent No. 3,179,195. Each motor M is connected by lead wires W to a pair of contacts 78 and 79 mounted in the end of each shaft 61. Within the hollow cylinder 60 there are two electrical contact slip rings 54 and 55 that are connected by leads 75, 76 to ground and to the power supply (FIG. 6). Contacts 78 and 79 are in the form of spring pressed slipping or sliding contacts, each one being positioned to maintain contact on its respective slip ring 54 or 55. Thus with the rotation of caster 62 the electrical potential is supplied as desired to the motor M. Although an important action of all caster wheels is the ability to turn and allow the vehicle to move in the direction of force generated by collision or impact with an object to deflect in the direction of all resulting forces produced by collision or impact with an external force that is opposite to or in a different direction than the direction of movement of the vehicle, it is also necessary to provide a means for steering the travel or movement of the vehicle. Referring to FIG. 5 there is illustrated a mechanical means for steering a swiveling caster wheel and although one caster has been illustrated, more than one such arrangement may be interconnected or all casters may be so interconnected, and a single operating wheel or V pulley 56 may be mechanically or electrically controlled (as shown in FIG. 6) by the operator in steering the vehicle.

The operating or steering wheel or wheels 56 for each caster whether individual or interconnected is comprised of a wheel 56 mounted on a shaft 57, shaft 57 is supported in a journal or bearing 58 that is mounted in an extended portion 71A of cup 71. The end of shaft 57 having a gear 59 affixed to it. Gear 59 being meshed with a gear 49 that is integral with the caster frame 63, thus turning wheel 56 whether manually or electrically will also turn the caster as desired. With one caster, preferably the leading caster so connected, the entire vehicle will follow the travel as directed and full castering effect is provided on all wheels, the steering wheel or wheels are provided with a shear pin 48, so that when a castering force or deflection of direction of the vehicle is greater than a predetermined amount the pin 48 will shear and allow the caster or casters to turn and move in the same direction as the colliding vehicle or colliding force that deflects the normal travel of the vehicle. Referring to FIG. 6 there is illustrated a schematic diagram of the electrical control circuit for all caster wheel motors. There are a plurality of caster wheels, in this embodiment there are four, in other designs there may be several. The motor M in each caster wheel is connected by lead 75 to ground, and 76 to a power source 77. A battery (power source) is connected on one side to ground and on the opposite side of the battery to a rheostat 78. The opposite side of the rheostat is connected to lead 76 which is the opposite lead of the motor M. Thus with power supplied by a battery 77 and with the control of rheostat 78, the motors M may be operated. The power source 77 may be in any desirable form such as a fuel cell or motor driven generator or battery as illustrated. The casters may also be controlled for steering by an electrical circuit as illustrated in FIGS. 5 and 6. Referring to FIG. 5 the steering V pulley 56 may be connected to a driving V pulley 56′ by a belt. Pulley 56′ being mounted on the drive shaft of a steering reversible motor M′. With all caster wheels connected to steering motors M′, the motors may be controlled by a reversing switch 79 (FIG. 6). Thus with the battery 77 grounded on one side, the opposite side may be connected to the center post of the reversing switch 79. The two terminals R and L being the means of supplying electric power to either side of the motors M′. When switch 79 is closed on terminal R, the motors M′ will turn clockwise turning all casters to the right, when closed on terminal L the motors turn counterclockwise turning all casters to the left. Although all casters are shown with steering motors M′, it is to be understood that one caster, or tow casters (front and rear) may be steered and the remaining casters disconnected as desired. It is apparent that any wheel providing drive through its motor M must be controlled or steered through its motor M′. Referring to FIG. 7 there is illustrated one form of capsule or body to be utilized with this device. Body 11 may be a multiple or single shell of a tubular form such as shown in FIGS. 2 and 3. Or, as a further embodiment as illustrated in FIG. 7, the single shell body 11′ is mounted within a larger circular shell 16 to be closed at either end semi-circular in form or in any preferred design and resistant means such as springs 25 and 26 or air cushions are mounted in shell 16 to retain body 11′ centrally positioned. A door 27 may be provided as shown in shell 11′ and aligned with a similar opening in shell 16 by slidable or rotational means. Door 27 would necessarily be a sliding or rotating type door for opening and closing the aperture and the same method applied to windows. It is apparent that this illustrated embodiment in use provides additional shock resistances, that is, in the event the vehicle were in collision, the forward momentum of body 11′ will be partly absorbed by spring 25 and any striking force at rear of body 16 would be absorbed by spring 26 to again balance body 11′ in its centralized position.

Referring to FIGS. 8 and 9 there is illustrated a further embodiment of this invention in which vehicle 80 is comprised of a supporting framework 82 that will compress in length while expanding in width or compress in width while expanding in length. Framework 82 is supported on an undercarriage 84 that is in turn supported on a plurality of swiveling casters 15. The casters 15 are similar to those disclosed in the prior embodiment. The supporting framework 82 supports a body 11 similar to that described in the previous embodiment and as already described in FIG. 7, the body 11 may take other forms being similarly supported in the manner illustrated in FIGS. 8 and 9. The expansile undercarriage 84 is comprised of four side struts 85 that are similar in length and provided with apertures 86 at either end thereof. A pin 61′ which is the pin extending upward from caster 15 is mounted through apertures 86 for the mounting of each caster at each of the four connecting points of struts 85 as illustrated in FIG. 8. A pair of struts 87 are mounted in a scissor relationship, that is, they are pivotally supported at their center by a pin 88 and struts 87 are provided with apertures at either end and are pivotally connected by pins 89 to the center of struts 85. Thus a quadrangular framework is formed that may assume a configuration as illustrated in FIG. 8 in solid lines and may be changed in its configuration to the form illustrated in dotted lines. The normal operating position of the framework is longer than as illustrated in full lines in FIG. 8 and shock struts 90 are positioned within the framework to retain the framework as illustrated, that is, a strut 90' will be mounted to the framework at the front end F by pin 86 and the opposite end of shock strut 90' will be connected to pin 88. Similarly a strut $90^2$ is positioned in alignment with the front strut and connected to the framework by a pin 61' at the rear R of the framework while the opposite end of strut $90^2$ is connected to pin 88. A third strut $90^3$ is positioned on one side of pin 88 being connected to pin 88 at one end and being connected to the framework by pin 61' at the right side S. A fourth strut $90^4$ is similarly connected to pin 88 at one end and the opposite end to the left side P of the framework by means of pin 61'. It is apparent with the framework connected as described and the struts interconnected in the relationship described that a sudden deceleration of the forward end F would produce a change in the framework or undercarriage due to the momentum of the vehicle, that is, all of the vehicle would move forward as it expanded in width being resisted by shock 90' and further resisted by a pull on a double acting shock absorber $90^2$. Thus with all shock absorbers 90 designed as double acting shock absorbers, shocks 90' and $90^2$ will absorb a great deal of the kinetic energy in collision and will raise the body 11, then the lowering of the body after deceleration, due to its weight, will assist in returning the framework to its original form. The struts 87 provide reinforcing strength to the framework in impact preventing the deformation or complete collapse of the side struts 85. The shocks $90^3$ and $90^4$ act in a similar manner in the event another vehicle collides on either side, absorbing the force of impact and expanding the undercarriage to its original form as illustrated.

It is to be noted, referring to FIG. 9, that body 11' is supported in a different manner than the embodiment illustrated in FIGS. 1 and 2, that is, body 11' is supported on a framework 100, the framework 100 being centrally supported on pin 88 so that the framework 100 and body 11' can rotate 360° upon the undercarriage 84. The framework 100 comprises an X shaped frame 101 comprised of a pair of struts 102 and 103 that are crossed at pin 88 and supported by pin 88. Struts 102 and 103 are joined at either end by a short element 104 to retain struts 102 and 103 in their X shaped formation. The framework 100 also includes a pair of pivotally supported struts 105 and 106. Struts 105 and 106 are pivotally affixed to a right angle brace 107 that is affixed at either end of the front element 104 of the framework 100. Thus struts 105 may be pivotally moved from a nearly horizontal relationship to a raised position as illustrated in FIG. 9. At the opposite end of struts 105, body 11' is pivotally supported by releasable pins 108 and 109, pins 108 and 109 in turn being mounted in body braces 110 and 111. The braces 110 and 111 are affixed in a parallel relationship to body 11', that is, on either side of body 11'. At the rearward end of body 11' in the lower portion there is a pin 112 passing through the body. Within the body a flexible strut 114 is mounted at one end in a pivotal relationship to pin 112. The flexible strut 114 extends rearwardly and bears upon element 104, that is slidable upon element 104. In affixing the body braces 110 and 111 to the body 11' it is important to set these braces somewhat forward of center of body 11' so that in the normal operation of the vehicle, body 11' can rest supported on the framework 100 as described with body 11' in its lowermost position as illustrated in dotted lines in FIG. 9. However in the event of impact in a collision, the momentum of the forward movement of body 11' is transposed to struts 105 and due to their pivotal mounting on framework 100, the body 11' will move forward and upward and at the same time the flexible strut 114 will bear upon element 104 in a sliding relationship to maintain body 11' in a prescribed arc of movement without allowing body 11' to rotate or move beyond a desired degree of rotation. As the force of impact is expended, the body 11' will drop by its own weight back to its original position. It is also to be noted that if the impact is toward the right or left, the complete framework will tend to rotate into the direction of the striking force and the body will move as above described. Due to the pivotal support of the body on pin 88, the body is free to pivot. When there is motion, the body gains momentum in the direction of motion. When there is a frontal impact on center or right or left of center, there is a resistance to the forward movement and to the momentum of movement of the body. The point of maximum resistance to forward movement produces a resultant reaction to deflect the momentum of the body toward that point. If there is a side impact midway between the front and rear or to the rear of center, the body, due to its inertia or momentum, will react according to a force diagram in which the degree of inertia and direction of the body is altered, the body tending to move in the direction of the resultant force.

Referring to FIG. 2 it is to be noted that the body 11 may assume an almost vertical position in an extreme collision. In this event the passengers and operator are effected by two forces, one force being the forward inertia or momentum which in this example would be the greater force. The other force would be produced by the rotation of body 11 tending to throw the passenger or operator outward by centrifugal force, this would be extremely small compared to the forward inertia. Thus the passengers and operator would, by inertia, be forced deeper into the seat and with seat belts that are becoming universal for high speed travel, the passengers and operator would be safely retained in such a collision.

Various changes may be made in the components described, that is, for example in FIG. 7 instead of springs 25, gas filled envelopes or cushions of air or gas may be utilized and although a motor such as illustrated in Patent No. 3,179,195 has been designated, other motors of this type may be utilized and due to the wheels being mounted as swiveling casters, the motor power leads may be through the caster and by means of slipring contacts the energy may be supplied to the motor at any time during the 360° rotation of the caster 15. It is also to be noted that the vehicle is adaptable for use in the air and on water, it is primarily designed for operation upon land, however in view of the fact that the vehicle may be landed on water or propelled from land into water, flotation bladders or tanks 116 may be built in or attached in equal spaced relation within the supporting framework 82. The vehicle body 11' is also releasable from its framework by releasing pins 108 either as explosive pins or electrically pulled pins. It is also to be understood that although body 11 and 11' have been illustrated in a particular form, this form of body may be varied but an elongated body is preferable. It is to be further understood that, although the caster and wheel design illustrated are not in final design or form to be used they serve to illustrate the general mechanical and electrical principles and the relationship between the caster, wheel and motor may vary to suit the particular purpose and power, it is to be understood that further changes in the type of shock struts may be made and although a form of power such as an electric motor has been shown, it is to be understood that any other form of power such as a reaction propulsion engine, jet engine, etc. may be used without departing from the spirit of this invention and this invention shall be limited only by the appended claims.

What is claimed is:

1. A wheeled vehicle provided with collision resistant components designed to absorb, neutralize and disperse destructive kinetic energies generated by collision which include a lateral and longitudinal pivotally interconnected contractile and expansile main framework, a plurality of swiveling caster mounted wheels to support said framework, an enclosed multi-tubular vehicle body pivotally retained above said main framework about an axis lateral to the axis of the body by pivoted supporting struts lateral and longitudinally positioned shock absorbers connected between corresponding opposite ends of the main framework to absorb the kinetic energy of the vehicle in any degree of deceleration.

2. In a device according to claim 1 in which said main framework is quadrangular.

3. In a device according to claim 1 in which said caster mounted wheels are individually driven.

4. In a device according to claim 1 in which said vehicle body, is lifted by said supporting struts of said main framework when said main framework contracts longitudinally and expands laterally and is lowered by said supporting struts to a normal position when said main framework contracts laterally and expands longitudinally.

5. In a device according to claim 1 in which said vehicle body is pivotally hung on said lateral axis at the center of said body to swing about its pivotal mounting by induced intertia when lifted by said supporting struts.

6. In a device according to claim 1 in which said pivotally connected body supporting struts are a secondary framework that is pivotally supported on the contractile and expansile main framework to lift said body when the main framework is contracted.

7. In a device acording to claim 1 in which all the swiveling caster mounted wheels are provided with sheer pins to retain their normal driving position, and means connected to each caster wheel to steer and means interconnected to steer all caster wheels in unison.

8. In a device according to claim 7 in which said swiveling caster mounted wheels are pinned in a fixed relation with a gear driven steering means and in which said pins are pre-stressed to shear under a defective force contrary to the induced force of inertia produced under driving movement.

9. In a device according to claim 1 in which the vehicle body is multi-tubular in form and mounted within an outer tube having shock absorbing means.

10. A wheeled vehicle provided with collision resistant components designed to absorb, neutralize and disperse destructive kinetic energies generated by collision which includes a lateral and longitudinal contractile and expansile main framework, a plurality of swiveling caster mounted wheels to support said framework, an enclosed multi-tubular vehicle body retained above said main framework by supporting struts on a horizontal platform in a horizontally pivotal relation to the main framework of the vehicle, lateral and longitudinally positioned shock absorbers connected to the main framework to absorb the kinetic energy of the vehicle in any degree of deceleration.

11. In a device according to claim 10 in which said vehicle body is lifted by said supporting struts when said main framework contracts longitudinally and in which said body may swing about its pivotal mounting when lifted and in which the swing of said body is restricted by a flexible strut.

12. In a device according to claim 10 in which said vehicle body is pivotally moved upward by a pair of pivotally supporting struts that are affixed to said horizontal platform and in which the rearward end of said body is restrained from rotation by a resilient element.

13. In a device according to claim 10 in which said main framework is provided with a plurality of flotation elements.

14. In a device according to claim 10 in which there is provided releasing means to release said vehicle body from said supporting struts.

References Cited
FOREIGN PATENTS 322,382   11/1934   Italy.
287,233   3/1953   Sweden.

A. HARRY LEVY, *Primary Examiner.*